Figure 1:
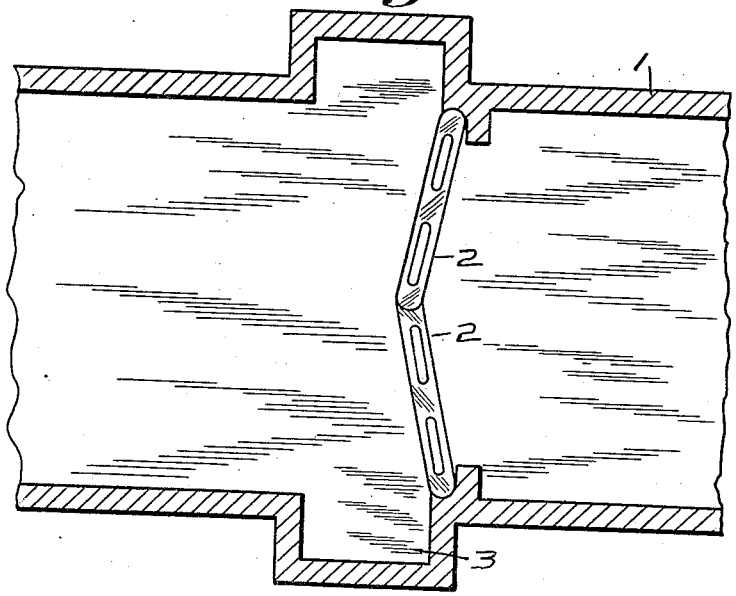

J. R. SCOHY.
GLASS FURNACE.
APPLICATION FILED NOV. 28, 1919.

1,347,181. Patented July 20, 1920.

UNITED STATES PATENT OFFICE.

JOHN R. SCOHY, OF OKMULGEE, OKLAHOMA.

GLASS-FURNACE.

1,347,181.  Specification of Letters Patent.  Patented July 20, 1920.

Application filed November 28, 1919. Serial No. 341,274.

*To all whom it may concern:*

Be it known that I, JOHN R. SCOHY, a citizen of the United States, and a resident of Okmulgee, in the county of Okmulgee and State of Oklahoma, have invented a certain new and useful Glass-Furnace; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object particularly to provide an improvement in glass furnaces whereby the dross from the skimming may be readily collected and removed from the furnace and in such a way that it will not work down into the molten glass that gradually moves toward the blow holes.

Glass furnaces containing my invention may partake of different forms and to illustrate a practical application of the invention I have selected one of such structures which is shown in part in the drawings and shall describe the structure hereinafter.

Figure 2:
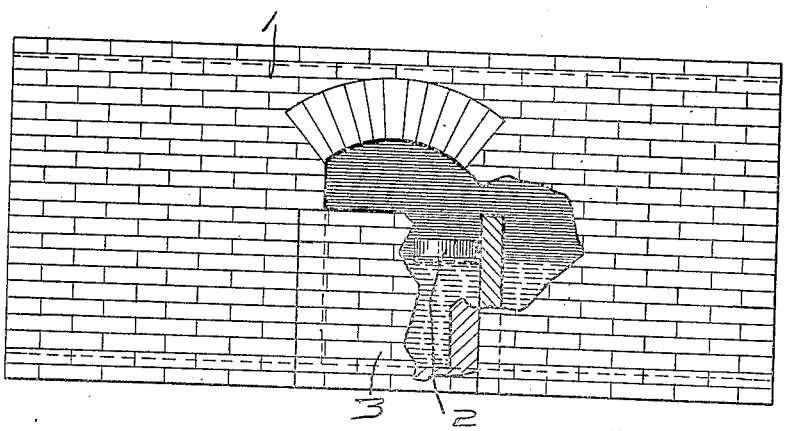

Figure 1 of the drawings illustrates a horizontal sectional view of a portion of a glass furnace containing my invention. Fig. 2 illustrates a broken view looking from the side of the furnace.

1, in the figures, is a glass furnace, a part of which is shown in the drawing. The left hand end of the furnace is provided with the usual heating means and blast, well known in the art of glass making, while the right hand end is provided with the usual blow holes through which the operators secure the molten glass. 2 are the floaters that ride on the surface of the molten glass in the manner well known in the art, to keep back the scum, that collects on the surface of the glass, from the blow holes. The floaters 2 interlock by interkeying at their adjoining ends and by being blocked at the sides of the furnace, as is well known. The floaters maintain their position by reason of the more or less constant movement of the glass toward the blow holes. In order that they may thus interlock they are set at an incline with reference to the longitudinal axis of the furnace or the direction of movement of the glass. The furnace 1 is provided with pockets 3 that are located in advance of the outer ends of the floaters 2. Openings are formed in the wall of the furnace above the pockets to permit free access to the pockets. The glass moving along the furnace will carry the scum against the floaters 2 and the inclination of the floaters relative to the direction of the movement of the glass will cause the scum that is held back by the floaters to work into the pockets from whence it can be easily removed. This prevents the gradual working of the scum beneath the floaters and thus prevents the scum from reaching that part of the glass that is being consumed or used by the blowers in forming the glass.

I claim:—

1. A glass furnace having floaters and pockets formed in vicinity of and in advance to the outer ends of the floaters for collecting the scum held back by the floaters.

2. A glass furnace having floaters located in an inclined position relative to the direction of movement of the glass in the furnace, and pockets formed in vicinity of and in advance to the outer ends of the floaters for collecting the scum held back by the floaters.

In testimony whereof I have hereunto signed my name to this specification.

JOHN R. SCOHY.